(12) United States Patent
Sela et al.

(10) Patent No.: US 9,880,783 B2
(45) Date of Patent: Jan. 30, 2018

(54) SYSTEM AND METHOD FOR UTILIZATION OF A SHADOW DATA BUFFER IN A HOST WHERE THE SHADOW DATA BUFFER IS CONTROLLED BY EXTERNAL STORAGE CONTROLLER

(71) Applicant: SanDisk Technologies Inc., Plano, TX (US)

(72) Inventors: Rotem Sela, Haifa (IL); Alon Marcu, Tel Mond (IL); Nir Perry, Hod Hasharon (IL); Miki Sapir, Nes Ziona (IL); Hadas Oshinsky, Kfar Saba (IL); Julian Vlaiko, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 23 days.

(21) Appl. No.: 14/925,619

(22) Filed: Oct. 28, 2015

(65) Prior Publication Data

US 2017/0123722 A1    May 4, 2017

(51) Int. Cl.
*G06F 3/06* (2006.01)

(52) U.S. Cl.
CPC .......... *G06F 3/0656* (2013.01); *G06F 3/0604* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 4,959,774 A | * | 9/1990 | Davis | G06F 1/30 365/228 |
| 5,073,851 A | * | 12/1991 | Masterson | G06F 12/1054 711/128 |

(Continued)

FOREIGN PATENT DOCUMENTS

WO    WO 2006/006694 A1    1/2006

OTHER PUBLICATIONS

International Search Report and Written Opinion for Patent Cooperation Treat application No. PCT/US2016/051260 dated Jan. 19, 2017.

(Continued)

*Primary Examiner* — Ann J Lo
*Assistant Examiner* — Chie Yew
(74) *Attorney, Agent, or Firm* — Brinks Gilson & Lione

(57) ABSTRACT

Systems and methods for managing transfer of data into and out of a host data buffer of a host are disclosed. In one implementation, a partial write completion module of a storage system retrieves from the host, stores in a memory, and acknowledges retrieving and storing with a partial write completion message, each subset of a larger set of data associated with a host write command. The host may utilize received partial write completion messages to release and use the portion of the host data buffer that had been storing the subset identified in the message rather than waiting to release data associated with the host write command until all the data associated with the command is stored in the memory. The memory in which each subset is stored may be (Continued)

non-volatile memory in the storage device or a shadow buffer on the host or an external memory device.

9 Claims, 11 Drawing Sheets

(56) References Cited

U.S. PATENT DOCUMENTS

| | | | |
|---|---|---|---|
| 5,987,582 A * | 11/1999 | Devic | G06F 12/1081 |
| | | | 345/543 |
| 8,423,710 B1 | 4/2013 | Cole | |
| 8,918,580 B2 | 12/2014 | Cheon | |
| 9,170,939 B1 * | 10/2015 | Jones | G06F 12/0246 |
| 9,280,469 B1 * | 3/2016 | Kuang | G06F 12/0815 |
| 9,378,049 B1 | 6/2016 | Johnson | |
| 9,594,514 B1 * | 3/2017 | Bono | G06F 12/00 |
| 2005/0210190 A1 | 9/2005 | Yamada | |
| 2006/0112252 A1 * | 5/2006 | Dixon | G06F 12/0866 |
| | | | 711/170 |
| 2006/0126390 A1 | 6/2006 | Gorobets et al. | |
| 2007/0283131 A1 * | 12/2007 | Sagalovitch | G06F 9/485 |
| | | | 712/203 |
| 2008/0307155 A1 * | 12/2008 | Sinclair | G06F 3/061 |
| | | | 711/103 |
| 2010/0106893 A1 | 4/2010 | Fasoli et al. | |
| 2010/0106904 A1 * | 4/2010 | Berke | G06F 11/1441 |
| | | | 711/114 |
| 2010/0318721 A1 | 12/2010 | Avila et al. | |
| 2010/0318839 A1 | 12/2010 | Avila et al. | |
| 2011/0055457 A1 | 3/2011 | Yeh | |
| 2011/0145474 A1 | 6/2011 | Intrater | |
| 2011/0173372 A1 * | 7/2011 | Schuette | G06F 12/0866 |
| | | | 711/102 |
| 2011/0208900 A1 * | 8/2011 | Schuette | G06F 12/0866 |
| | | | 711/103 |
| 2012/0001252 A1 * | 1/2012 | Alsmeier | H01L 27/11551 |
| | | | 257/321 |
| 2012/0246392 A1 | 9/2012 | Cheon | |
| 2012/0272114 A1 | 10/2012 | Cho et al. | |
| 2012/0324176 A1 * | 12/2012 | Bohling | G06F 3/0608 |
| | | | 711/154 |
| 2013/0227347 A1 | 8/2013 | Cho et al. | |
| 2014/0059280 A1 | 2/2014 | Im et al. | |
| 2014/0149607 A1 | 5/2014 | Shim et al. | |
| 2014/0281683 A1 | 9/2014 | Dusija et al. | |
| 2014/0376310 A1 | 12/2014 | Kim et al. | |
| 2015/0026411 A1 | 1/2015 | Lippert et al. | |
| 2015/0046625 A1 | 2/2015 | Peddle | |
| 2015/0155050 A1 | 6/2015 | Trantham et al. | |
| 2017/0123721 A1 | 5/2017 | Sela et al. | |
| 2017/0123991 A1 | 5/2017 | Sela et al. | |

OTHER PUBLICATIONS

International Search Report and Written Opinion for Patent Cooperation Treaty application No. PCT/US2016/050743 dated Nov. 7, 2016.

Anonymous et al., "AN1727 Application Note, How to Use the Cache Program Feature of NAND Flash Memories", May 2004, pp. 1-10.

Anonymous, "Toshiba MOS Digital Integrated Circuit Silicon Gate CMOS 1G Bit (128M x 8 Bit) CMOS NAND E2PROM", Aug. 31, 2012, 51 pages.

Copending U.S. Appl. No. 14/925,541, filed Oct. 28, 2015 entitled "System and Method for Utilization of a Data Buffer by Command Completion in Parts".

Copending U.S. Appl. No. 14/925,334, filed Oct. 28, 2015 entitled "System and Method for Utilization of a Data Buffer in a Storage Device".

Office Action for copending U.S. Appl. No. 14/925,541, dated Jul. 6, 2017, 19 pages.

Office Action for copending U.S. Appl. No. 14/925,334, dated Jul. 19, 2017, 16 pages.

* cited by examiner

SYSTEM AND METHOD FOR UTILIZATION OF A SHADOW DATA BUFFER IN A HOST WHERE THE SHADOW DATA BUFFER IS CONTROLLED BY EXTERNAL STORAGE CONTROLLER

BACKGROUND

Non-volatile memory systems, such as flash memory, are used in digital computing systems as a means to store data and have been widely adopted for use in consumer products. Non-volatile memory systems may be found in different forms, for example in the form of a portable memory card that can be carried between host devices or as embedded memory in a host device. In typical write operations between a host device and a non-volatile memory system, the host device will have a host controller that is configured to store command information and command data in the host device until a confirmation is received from the non-volatile memory system that write operations for all of the data for a write command have been completed. Once the confirmation message is received from the non-volatile memory system, the host device may then release the data from the host buffer.

DETAILED DESCRIPTION

Figure 1A:
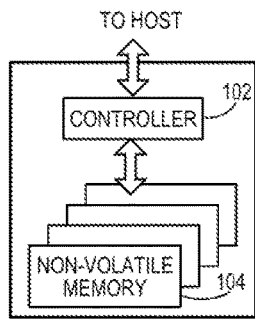
FIG. 1A is a block diagram of an example non-volatile memory system.

A host and non-volatile memory system are described herein that can implement completion of a host command in parts such that the host may release portions of the host data buffer to receive new host data after each part of the host command is completed, rather than needing to wait until all data for the host command has been written before the host data buffer is released and available to receive more host data for other commands. Additionally, a system and method of using a shadow buffer on a host, separate from a host data buffer holding data associated with pending host commands and where the shadow buffer that is controlled by the non-volatile memory system, is disclosed. Implementations including shadow buffer on the host, or that is on an external memory device in other embodiments, may be used with or without the partial command completion techniques described below. Although the examples below generally discuss a host write command and the completion and acknowledgement of writing subparts of the total amount of data associated with a host write command, the systems and methods described herein may be applied to any of a number of types of host commands.

In one implementation, a data storage system may include a non-volatile memory and a controller in communication with the non-volatile memory. The controller is configured to request, from a host data buffer on a host, a subset of a plurality of subsets of data associated with a host command. The controller is further configured to write the requested subset of data to a memory and then communicate a partial completion message to the host so that the host may use the partial completion message to release the portion of the host data buffer that was storing the requested subset prior to all of the plurality of subsets associated with the host command being written to the memory.

In different implementations, the memory that the partial write completion module writes the retrieved subset to prior to communicating the partial completion message may be non-volatile memory cells in the non-volatile memory of the data storage system, or it may be a shadow buffer on the host or on an external memory device separate from the host and data storage system. The partial completion message may include subset identification information that the controller may direct to a partial completion queue in the host, in addition to an interrupt that the controller may send to the processor of the host to notify the host to look at the partial completion queue.

In another implementation, a method of managing data is disclosed for a storage system that is in communication with a host. The storage system may request, from a host data buffer on the host, a portion of data that is less than an entirety of data in the host data buffer associated with a given write command. The storage system may then store the requested portion of data associated with the write command into a memory. The storage system may, responsive to storing the portion in the memory, transmit a partial write completion message to the host. The partial write completion message is sent after each different portion of data making up the entirety of data associated with the given host command is written such that the host can reuse space in the host data buffer corresponding to the portion of data that was just written to the memory prior to completion of writing the entirety of the data for the pending host command. Thus a partial completion message may be sent by the data storage system to the host after each subprocess is completed for the overall host process involved. In the case of a host write command, each subprocess is a write of a portion of the data that makes up the entirety of the data associated with the host command.

Storing the requested portion of data may include first writing the portion of data to a data buffer in the storage system and then copying the retrieved portion from the data buffer to non-volatile memory in the storage system. Alternatively, storing the retrieved portion of data may include first storing the retrieved portion into the data buffer in the storage system and then copying the data from the data buffer to a shadow buffer on either the host or a separate external memory device.

In another implementation, a method of managing data in a storage system in communication with a host includes the storage system reading a host command from a command queue in the host. The storage system may then cause the host to directly transfer a portion of the data associated with the host command from a host data buffer on the host directly to a shadow buffer on the host in an internal copy operation without transferring the portion of data through a memory outside of the host. Upon causing the host to transfer the portion of the data to the shadow buffer, the storage system transmits a partial write completion message to the host to permit the host to reuse space in the host data buffer corresponding to the portion of the data prior to the entirety of data for the host command being written to the storage system.

In yet another embodiment, a method of transferring data from a host to a storage system may include a controller on the host storing a command in a command queue on the host. The host controller may then store data associated with the command in a host data buffer in the host and transmit a message to the storage system that a host command is present in the command queue. The host may then receive a request from the storage system for a subset of the data associated with the command and then transmit the subset to a memory, which may be a shadow buffer on the host or on an external memory, or the non-volatile memory in the storage device. The host may then receive a partial write completion message from the storage system regarding a subset of data associated with the command and, in response, the host may release a portion of the host data buffer relating to only the subset of data without releasing other portions of the host data buffer containing other subsets of data associated with the host command.

In another implementation, a data storage system is disclosed. The storage system may include a non-volatile memory, a volatile memory having a local data buffer, and a controller in communication with the non-volatile and volatile memories. The controller may be configured to request, from a host data buffer on a host in communication with the data storage system, one of a plurality of data subsets of data associated with a particular host command, where the host command is directed to writing the plurality of data subsets to the non-volatile memory. The controller may then write the one of the plurality data subsets to a local data buffer in the data storage system and transmit the data subset from the local data buffer to a buffer in a memory outside of the data storage system prior to storing any of the plurality of data subsets in the non-volatile memory. The memory outside of the data storage system may be a volatile memory located in the host and controlled by the data storage system. The controller may be further configured to, only after transmitting all data associated with the particular host command to the buffer in the memory outside the storage system, transmit a command completion message to the host to permit the host to release all portions of the host buffer used to store the plurality of data subsets of data associated with the particular host command.

According to another aspect, a non-transitory computer readable medium is disclosed. The non-transitory computer readable medium may comprise processor executable instructions that, when executed by a controller of a data storage system, cause the controller to request, from a host buffer on a host in communication with the data storage system, data associated with a pending host command, the pending host command comprising a command to write the data to non-volatile memory in the data storage system. The instructions may further include instructions to cause the controller, in response to receipt of the requested data from the host buffer, to write the requested data to a local data buffer in a volatile memory in the data storage system and then transmit the requested data from the local data buffer in the volatile memory of the data storage system to a buffer in a volatile memory outside of the data storage system instead of writing the requested data to the non-volatile memory.

In yet another aspect, a method of managing data in a storage system in communication with a host is described. The method includes the storage system requesting data associated with a pending host command from a host data buffer in the host, the pending host command comprising an instruction to write the data associated with the pending host command to a non-volatile memory in the storage system. The method further includes writing the requested data to a shadow buffer, separate from the host data buffer, in volatile memory on the host. In response to verifying that all of the data associated with the pending host command has been written to the shadow data buffer on the host, and prior to writing any of the data associated with the pending host command to the non-volatile memory, the method further includes transmitting a command completion message to the host indicating that the host may release space in host data corresponding to the data associated with the pending host command.

Other embodiments and implementations are possible, and each of the embodiments and implementations can be used alone or together in combination. Accordingly, various embodiments and implementations will be described with reference to the attached drawings.

FIG. 1A is a block diagram illustrating a non-volatile memory system. The non-volatile memory (NVM) system 100 (also referred to herein as a storage system) includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, NVM system 100 may be a card based system, such as a secure digital (SD) or a micro secure digital (micro-SD) card. In an alternate embodiment, memory system 100 may be part of an embedded memory system.

Although in the example illustrated in FIG. 1A, NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
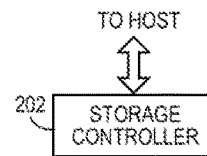
FIG. 1B is a block diagram illustrating an exemplary storage module.
Figure 1B:
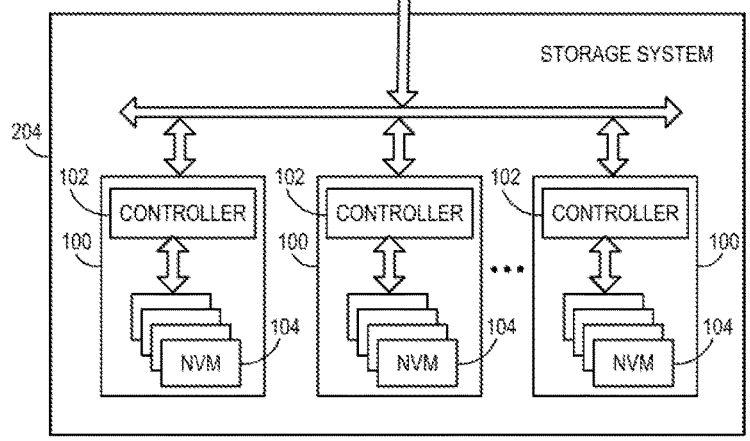

FIG. 1B illustrates a storage module 200 that includes plural non-volatile memory (NVM) systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
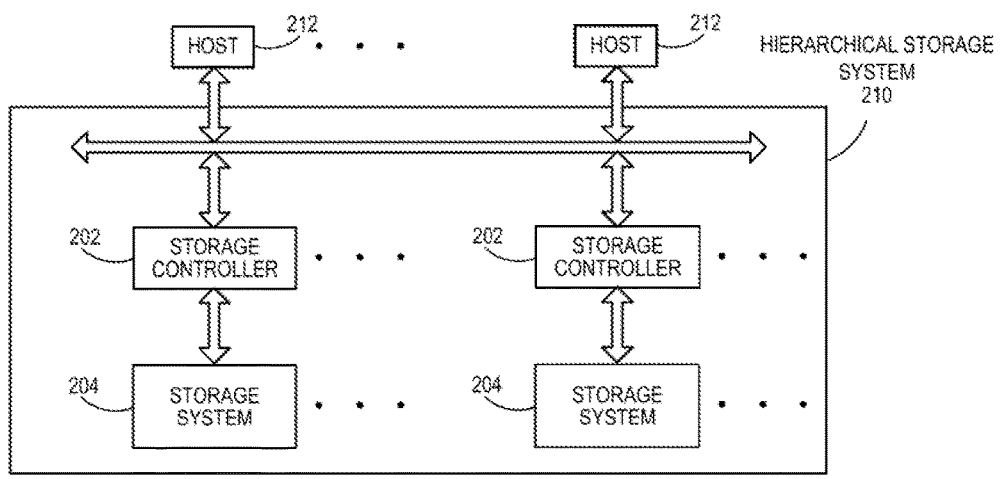
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
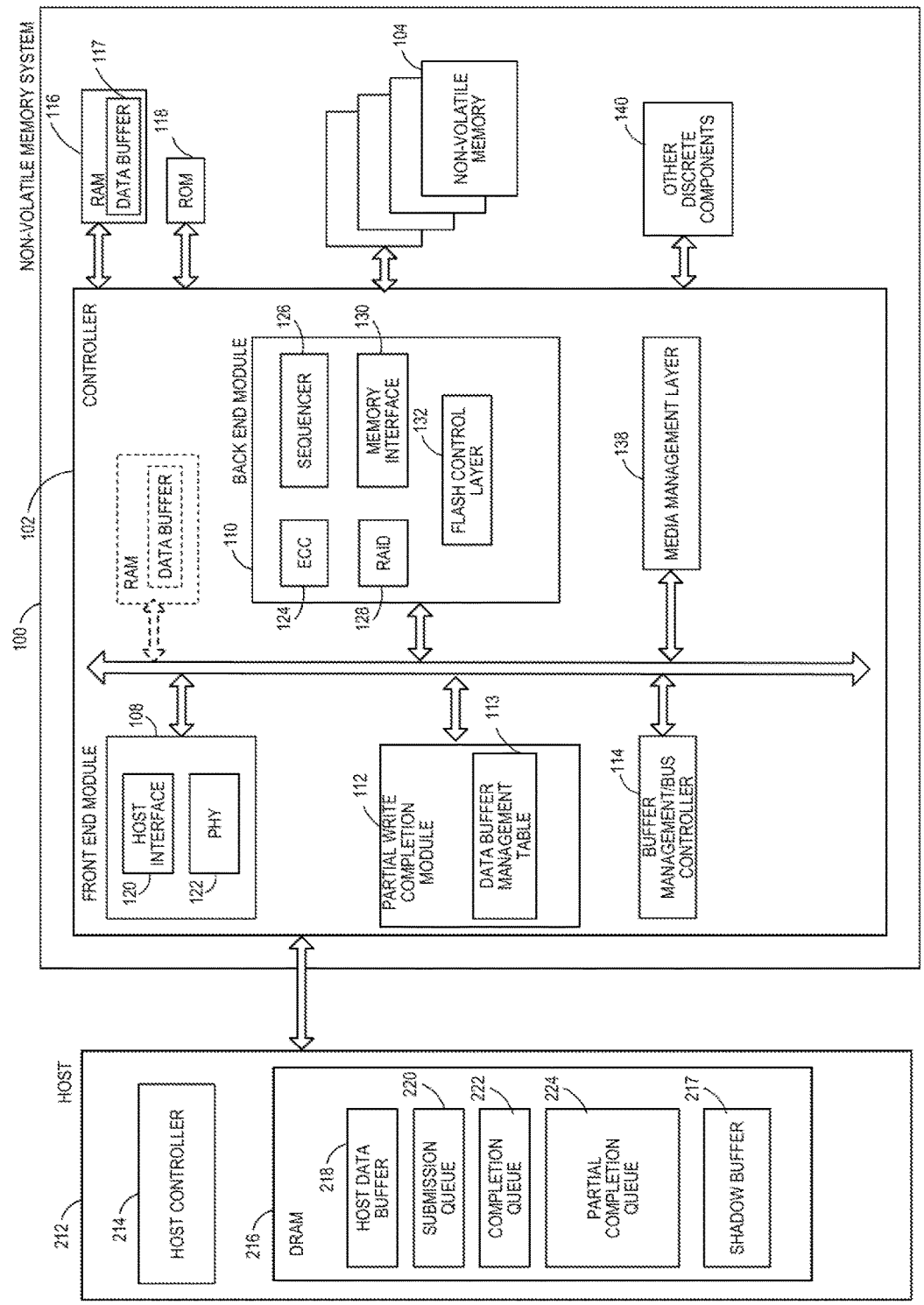
FIG. 2A is a block diagram illustrating exemplary components of a host and a controller of a non-volatile memory system.

FIG. 2A is a block diagram illustrating a host 212 and a NVM system 100 communicating via a host interface 120. In one implementation, the host 212 and NVM system 100 may be configured as NVMe devices and the interface 120 may be a PCIe interface. These particular formats and interfaces are only noted by way of example and any of a number of other formats and interfaces are contemplated such as NVMe and UFS. FIG. 2A also illustrates exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a partial write completion module 112 present on the die of the controller 102. As explained in more detail below in conjunction with FIGS. 6-8, the partial write completion module 112 may work with the host 212 to write portions of data associated with a particular host command, such as a host write command, and then provide partial completion messages to the host after writing each portion of the data associated with the particular host write command. The partial write completion module 112 may direct the portion of data associated with the particular host command to non-volatile memory in a non-volatile memory die 104 in the storage system, or to a shadow buffer 217 that may either be volatile memory in the host 212, or on an external memory device 402 (see FIG. 4) separate from the host 212 and non-volatile memory system 100.

A partial completion message may be transmitted to the host 212 from the partial write completion module 112 immediately after each portion of the data for the command is written to the non-volatile or volatile memory locations and before all portions of the data associated with the command are written. A data management table 113 may be updated to track the logical and physical location information for each portion of data. The table 113 may be in the partial write completion module 112 or stored elsewhere in memory in the NVM system 100. The host 212, in response to receiving each partial completion message, may then release the portion of its data buffer 218 that stored the portion of data from the write command prior to all the data for the particular write command being written to the NVM system 100. Although many of the examples below describe host write commands, where data associated with a host write command is to be eventually stored in the non-volatile memory of the NVM system 100, and partial completion of host write commands, the partial completion techniques below may apply to any type of host command that is associated with data that is transferred to the NVM system 100 for processing.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, one or both of the RAM 116 and ROM 118 may be located within the controller 102. The local data buffer 117 for storing portions of data associated with a host command may be located in the RAM 116 of the NVM system 100. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, UFS and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

FIG. 2A also illustrates aspects of a host 212 that the NVM system 100 may communicate with, manipulate and/or optimize. The host 212 includes a host controller 214 and volatile memory such as dynamic RAM (DRAM) 216. The host DRAM 216 may include a host data buffer 218, a command submission queue 220, a completion queue 222, a partial completion queue 224 and the shadow buffer 217. The host 212 may be configured to store user data in the host data buffer 218 and the commands associated with that user data in the command submission queue 220. The shadow buffer 217 is a portion of the DRAM 216 on the host 212 that is allocated for the exclusive use of the NVM system 100 and may be controlled via the partial write completion module 112 of the controller 102. As described in greater detail below, in one implementation the controller 102 may write subsets (also referred to herein as chunks) of host data associated with a host write command to the shadow buffer 217 on the host 212 rather than to a non-volatile memory die 104, and then provide a partial completion message to the host.

As shown in FIG. 2A, a buffer 117 may be located in volatile memory in the storage system 100, such as in RAM 116 that may inside or outside the controller 102. The buffer 117 may be used as the intermediate destination for chunks of data to be written to non-volatile memory on non-volatile memory die 104 or to be written to the shadow buffer 217 on the host. The shadow buffer 217, as described in greater detail below, is NVM system 100 space that may be used as storage space for chunks of data associated with a host command. In some implementations, the writing of the chunk by the NVM system 100 to the shadow buffer 117 may trigger a partial write completion message from the partial write completion module 112 even though the chunk has not yet been written to the non-volatile memory die 104. In yet other embodiments, there may be no shadow buffer and the process of the NVM system 100 writing portions of data associated with a write command and sending partial completion messages for each partial write may be based on the NVM system 100 writing data to the non-volatile memory die 100 without use of a shadow buffer.

Figure 2B:
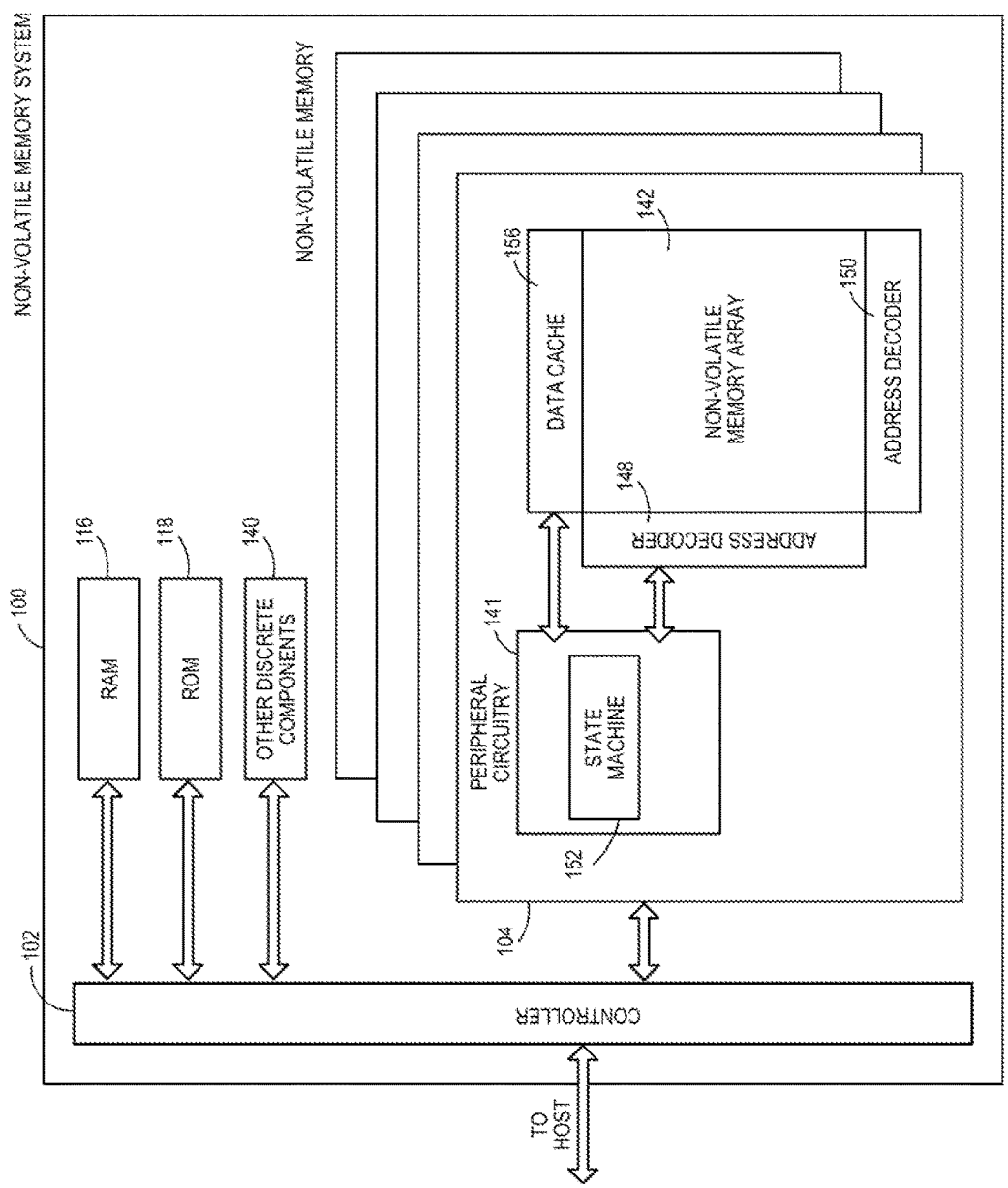
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. In one embodiment, the data cache 156 may include data latches.

Figure 3:
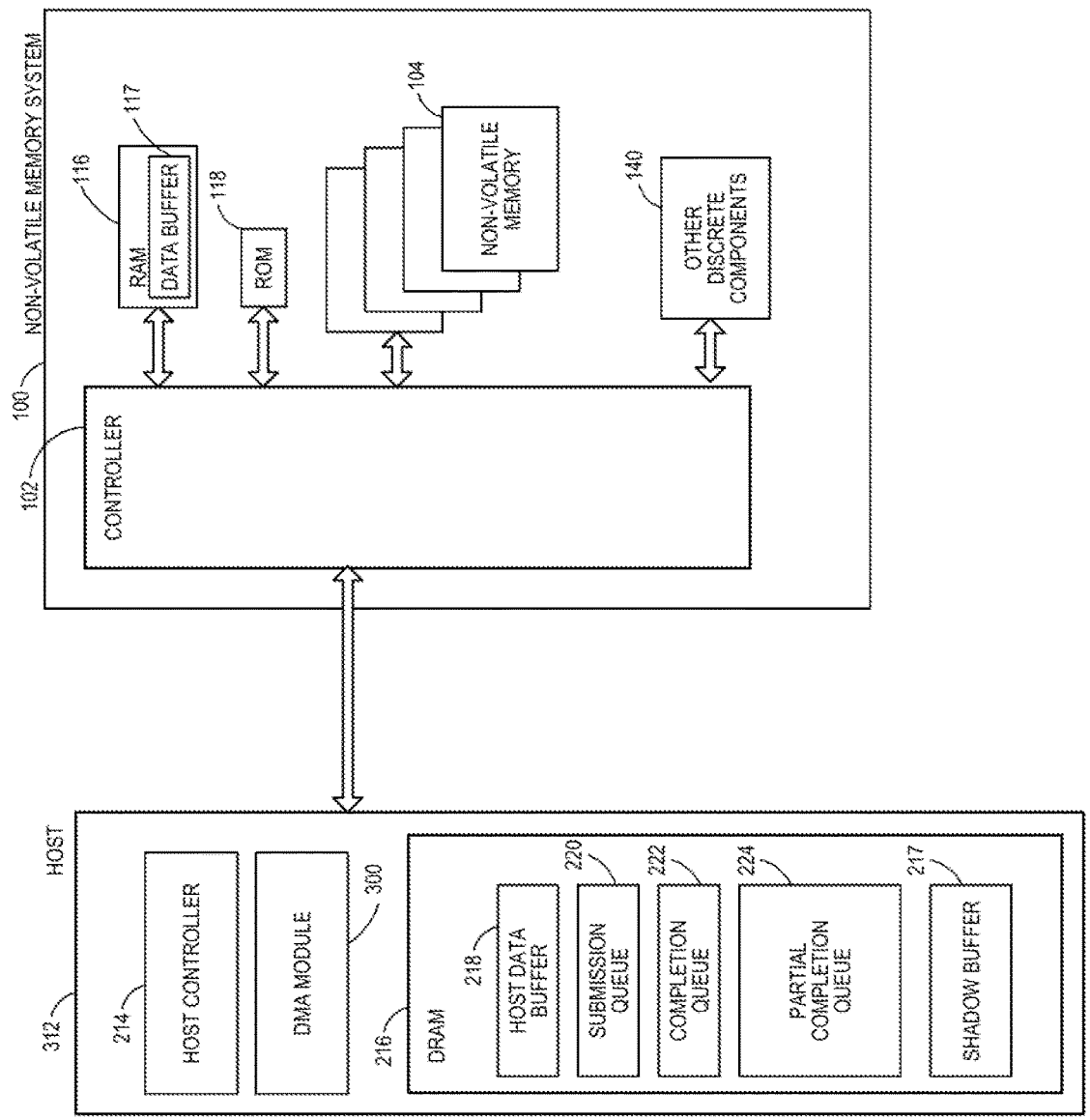
FIG. 3 illustrates an alternative embodiment of the host of FIG. 2A.
Figure 4:
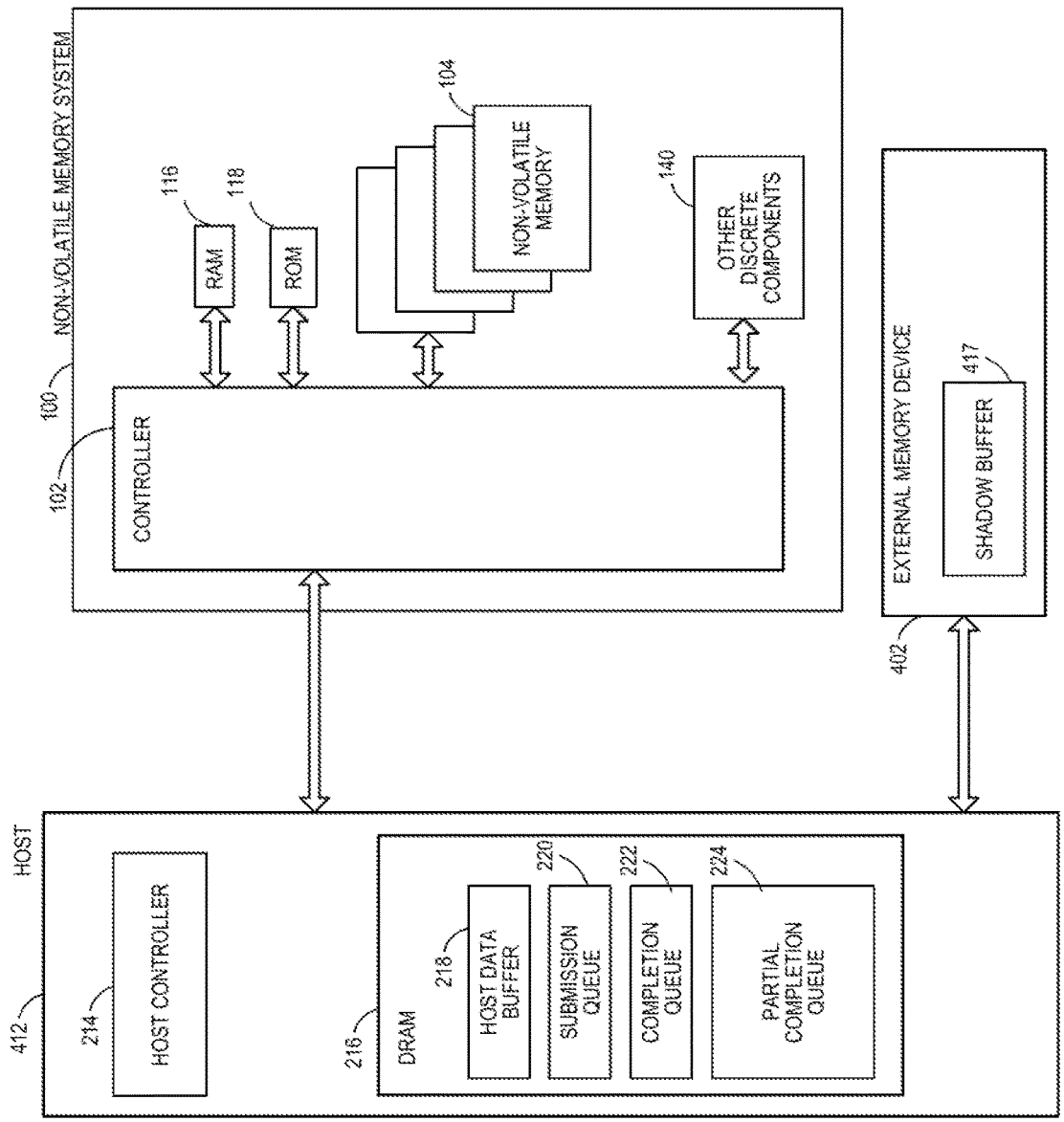
FIG. 4 is a block diagram illustrating a host, a non-volatile memory system and an external memory device.

Alternate implementations of the host and NVM system are illustrated in FIGS. 3-4. In FIG. 3, the host 312 includes many of the same components as illustrated in FIG. 2A and the NVM system 100 has been simplified for clarity. The host 312 in FIG. 3 differs from that of FIG. 2A in that a direct memory access module 300 is included that allows the partial command completion module 112 of controller 102 of the non-volatile memory system 100 to transfer data directly from the host data buffer 218 to the shadow buffer 217 on the host 312. The DMA module 300 thus allows the controller 102 to skip the step of first copying data from the host data buffer 218 to the data buffer 117 in RAM 116 in the NVM system 100 and then copying the data from the data buffer to the shadow buffer 217 on the host as is the case in the host configuration of FIG. 2A. In FIG. 4, a version of the shadow buffer 417 is shown on an external memory device 402 in communication with the host 412. In the implementation of FIG. 4, the shadow buffer 417 may be exclusively located on the external memory device 402, or may be combined with a shadow buffer 217 on the host 212 (FIG. 2A). The shadow buffer 417 may be volatile memory such as random access memory (RAM) or non-volatile memory.

Figure 5:
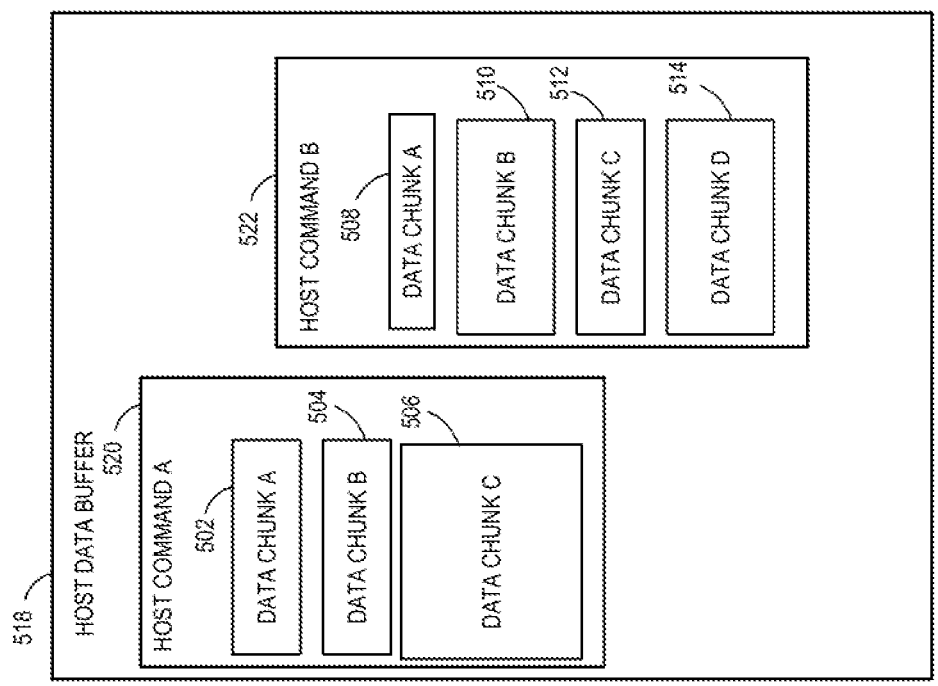
FIG. 5 is a block diagram illustrating a host data buffer with data for each host command divided into multiple chunks.

Referring to FIG. 5, an example of the host data buffer 518 is shown containing data for host commands. In this example, the data for host command A 520 is shown as made up of three separable data chunks of different sizes: data chunk A 502, data chunk B 504 and data chunk C 506. The data for host command B 522 is shown as made up of four data chunks, data chunk A 508, data chunk B 510, data chunk C 512 and data chunk D 514. The data chunks may be the same size or different sizes and, as discussed below, each chunk may be separately retrieved and stored by the NVM system 100, and a partial write completion message generated individually for each chunk prior to all chunks for a particular host command being written.

The data chunks may be of any size and the size may be a multiple of a page size managed in the non-volatile memory die 104 in one implementation. A data chunk is a subset or portion of the total amount of data associated with a given write command, where each chunk consists of a contiguous run of logically addressed data. A command having two or more chunks of data in its full set of data may take advantage of the partial completion techniques described herein. Additionally, the NVM system 100 may retrieve only part of a chunk of data and send a partial completion message upon writing (in any of the ways described above) the retrieved partial chunk. Thus, a host command associated with only a single chunk of data may be further broken up by the NVM system 100 to take advantage of the partial write completion techniques. The chunk size may be set by the NVM system 100 in a fixed, predetermined manner based on the size of the buffers 117 in RAM in the NVM system 100, the program sequence, the non-volatile memory (e.g. flash) page size in the non-volatile memory array 142, or any of a number of other parameters in different implementations.

Figure 6:
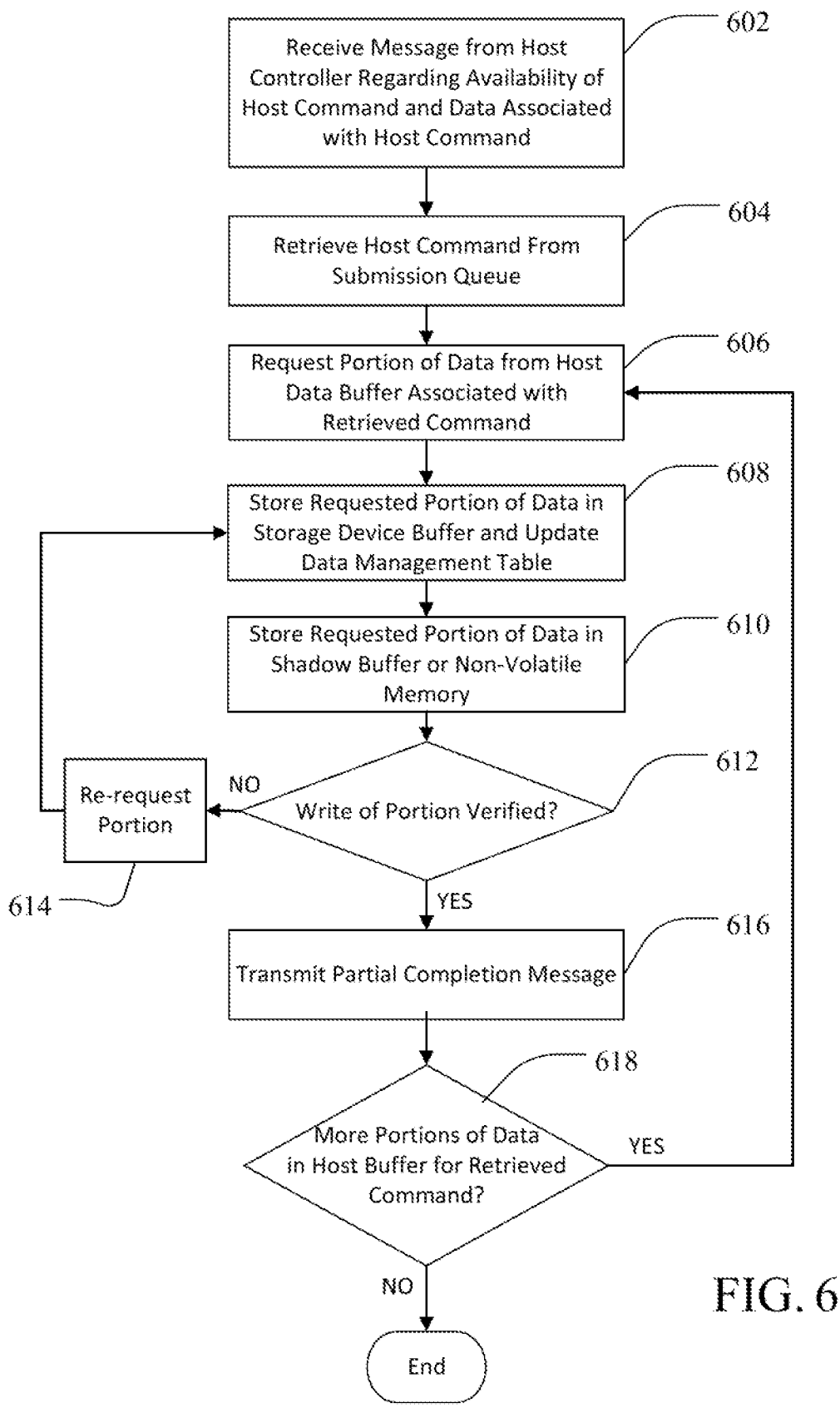
FIG. 6 is a flow chart illustrating an embodiment of a method executable on the non-volatile memory system to notify a host of partial completion of host write commands.

Referring to FIG. 6, a method of managing data writes using partial write completion techniques is described. When a host controller 214 receives a write command, it may place the command in a submission queue 220 on the host 212, store the data associated with the write command in the host data buffer 218, and transmit to the NVM system 100 a message indicating that a command is in the queue 220. The NVM system 100 may receive a message from the host controller 214 that a host command is in the submission queue 220 (at 602). The controller 102 of the NVM system 100 may then retrieve the host command (at 604) and then retrieve a chunk of the data associated with the host command from the host data buffer 218 on the host 212 (at 606). In one implementation, the controller 102 of the NVM system 100 requests the host send over a command from the submission queue and the entry in the submission queue 220 includes a pointer to the location of the associated data in the host data buffer 218. The controller 102 of the NVM system 100 may then request and store the chunk of host data for the host command in buffer memory, such as a local data buffer 117 in RAM 116 inside or outside of the controller 102 (at 608). The partial completion module 112 may then direct the chunk of data to the shadow buffer 217 on the host 212 rather than to the non-volatile memory die 104, or to non-volatile memory on one of the non-volatile memory die 104 (at 610). Alternatively, in implementations such as shown in FIG. 4 where the shadow buffer 417 is on an external memory device 402 and not in the host 412, the data chunk may be directed to the external shadow buffer 417 from the local data buffer 117 in RAM 116 rather than to the non-volatile memory die 104 or a shadow buffer 217 on the host 212. As soon as the chunk of data is stored in a shadow buffer 217, 417 or is programmed in non-volatile memory 104, the partial write completion module 112 may generate a partial completion message and transmit it to the partial completion queue 224 on the host 212.

In implementations where data chunks are written directly from the local data buffer 117 to the non-volatile memory die 104 rather than to a shadow buffer, the partial write completion module 112 only generates and sends the partial completion message after first verifying that the data chunk has been safely programmed to the non-volatile memory die 104 (at 612, 616). In these implementations, the verification may be a standard non-volatile memory verification message, such as a NAND flash memory verification message automatically generated in NAND flash and transmitted to the controller 102 from the non-volatile memory die 104 when a successful write has occurred that confirms there was no error in the programming steps carried out in the non-volatile memory cells of the non-volatile memory array 142.

Alternatively to, or in addition to, the NAND flash write verification noted above for implementations when the data chunk is written to non-volatile memory directly from the local data buffer 117, the partial write completion module 112 may utilize a different/second verification process to verify that the data does not have a second possible type of error. When data is written from the data buffer 117 directly to the non-volatile memory 104, in addition to potentially experiencing problems in the programming steps of a NAND flash write (a first possible type of error), data that is programmed successfully to NAND flash may sometimes experience a second type of error due to programming of other data to a same memory cell (in the case of NAND flash memory cells storing 2 or more bits per cell) or to an adjacent memory cell. Whether the data written from the local data buffer 117 in the NVM system 100 to the non-volatile memory 104 is free of this second type of error may also be verified. For example, an error correction code (ECC) may be checked as part of a read verification process for the data chunk as a way of verifying that the data chunk was written correctly. Although two types of write verification tests, the NAND programming verification and the ECC verification, are described as being used separately or in combination for writes from the local data buffer 117 to the non-volatile memory cells of the non-volatile memory 104, other verification tests may be used instead or, or in combination with these tests in other embodiments.

After verifying the success of the data chunk write to the non-volatile memory cells in the non-volatile memory 104 using one or more of the above-noted verification methods (at 612), the partial write completion message may be generated and sent by the partial write completion module 112 to the host 212 (at 616). In one implementation, the partial write completion message is sent to the partial completion queue 224 on the host 212. In situations where a verification check, such as either of the NAND programming verification or the ECC verification procedures noted above, indicates an error in the programming steps of the memory, an uncorrectable error or other corruption, then the partial write completion module 112 does not send a partial completion message and instead may go back to the host data buffer 218, retrieve that particular data chunk again and retry the partial write (at 612, 614, 608). The process of requesting additional portions (chunks) of the data associated with a retrieved host command then repeats until all portions have requested and retrieved from the host data buffer 218 (at 618). A command completion message may then be sent from the controller 102 to the completion queue 222 of the host 212 after all data chunks associated with the host command have been written and verified.

Referring again to FIG. 6, for implementations where a shadow buffer 217, 417 receives data chunks from the local data buffer 117 rather than the non-volatile memory die 104, the write verification (at 612) that triggers the controller 102 to send a partial completion message (at 616) may differ from the verification noted above. Because the data chunk is not being written from the local data buffer 117 to the non-volatile memory die 104 in this implementation, checking for a NAND programming error other non-volatile memory programming errors is unavailable. However, one or more other write verification techniques, such as checking for an ECC type of error may also be used in implementations where the data chunk is written to the local data buffer 117 from the host and then from the local data buffer 117 to a shadow buffer 217, 417. Thus, the verification check performed by the partial write module 112 when writing the data chunk to the shadow buffer 217 may be only the second type, ECC-related, verification noted previously because there is no NAND write involved. A DRAM programming completion acknowledgement from a shadow buffer 217, 417 may alternatively, or additionally, be used by the controller 102 as the write verification that precedes sending the host 212 a partial completion message for a given chunk of data.

The partial write completion module 112 may also transmit an interrupt message to the host 212 as part of the partial write completion operation to notify the host 212 that a partial completion message is waiting in the partial completion queue 224 in the host DRAM 216. The host controller 214 may then immediately release the portion of the host data buffer 218 that was storing the chunk of data identified in the partial write completion message. The release of the portion of the host buffer may be accomplished by updating a host mapping table to indicate that a range of addresses in the host data buffer 218 corresponding to the LBA range of the data chunk identified in the partial completion queue 224 is now available. The host controller 214 can then overwrite that released space in the host data buffer 218 for storing more data from another write command concurrently with remaining chunks of the prior write command being written to the NVM system 100 or waiting to be written to the NVM system 100.

Figure 7:
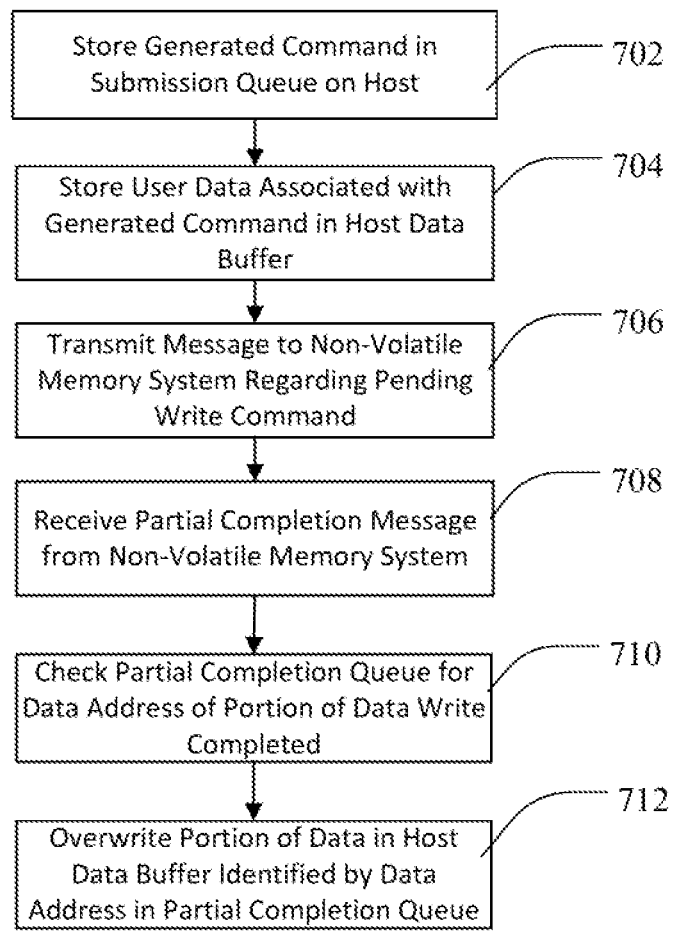
FIG. 7 is a flow chart illustrating an embodiment of a host managing a host data buffer based on partial completion of host write commands.

FIG. 7 illustrates the process of FIG. 6 from the perspective of the host 212. When the host desires to write data, the host controller 214 generates a write command and places it in the submission queue 220 in volatile memory such as DRAM 216 (at 702). The host controller 214 may also write user data associated with the write command in the host data buffer 218 in DRAM 216 (at 704). After sending a notification message to the NVM system 100, the controller will then receive a request from the NVM system 100 for a chunk of the data associated with the write command. The chunk (also referred to herein as portion) is a subset of the larger total set of data associated with the write command that is in the host data buffer 218. Referring to FIG. 5 for example, the chunk may be data chunk A 502 of the total amount of data (data chunk A 502, data chunk B 504 and data chunk C 506) of the total data associated with host command A 520. The host 212 will then receive a partial completion message from the partial write completion module 112 of the controller 102 as soon as the chunk of data for the host write command has been written to non-volatile memory or to a shadow buffer by the NVM system 100 as described above (at 708). The partial completion message may include an interrupt to the host controller 214 to prompt the controller to look at the partial completion queue 224 that the partial completion module 112 has updated with address information for a portion of data for a host command that has been written to a non-volatile memory die 104 or a shadow buffer 217,417 (at 710). The host controller 214 may then immediately use the identified space in the host data buffer, for example by overwriting the data at the identified address with new user data for a next host command (at 712).

As is seen in the discussion of FIGS. 6 and 7, each chunk or subset of the larger data set that defines the total amount of user data associated with a particular host write command may be separately acknowledged by the partial write module 112. As each data chunk is written to either a shadow buffer or to non-volatile memory, a partial write completion message is sent from the NVM system 100 to the host 212 and the host may then immediately release the host data buffer space that was holding that chunk or subset of data such that new data from another command may be placed in the host data buffer before all of the data chunks making up the data associated with a prior host command has been written.

The generation and transmission of a partial write completion message by the partial write completion module 112 only after a chunk of data is written into non-volatile memory or into a shadow buffer outside of the NVM memory system may help avoid data loss due to power losses or other write failure in the NVM system 100. In instances when the partial write of a data associated with a host command is acknowledged based on the controller 102 of the NVM system 100 writing to non-volatile memory in the non-volatile memory die 104, a power loss at the NVM system 100 should not affect data integrity. In instances where the partial write completion module 112 sends a partial completion message for each chunk of data written from the local data buffer 117 to a shadow buffer on the host or on a separate memory device, rather than to the non-volatile memory die 104, the data chunks written to the shadow buffer but not yet written to a non-volatile memory die should still be recoverable if a power loss (sometimes referred to as a voltage detection event or VDET) occurs in the NVM system 100. Because those data chunks have been written to a shadow buffer on a device (host or external memory device) that is separate from the NVM system 100, there may be a higher likelihood of recovery than if the data only remained in the local data buffer 117 in RAM 116 or elsewhere in the NVM system 100 when the NVM system loses power unexpectedly. The NVM system 100 may retry a failed write of a data chunk due to power loss or other cause of a write failure by retrieving that chunk from the shadow buffer.

Figure 8:
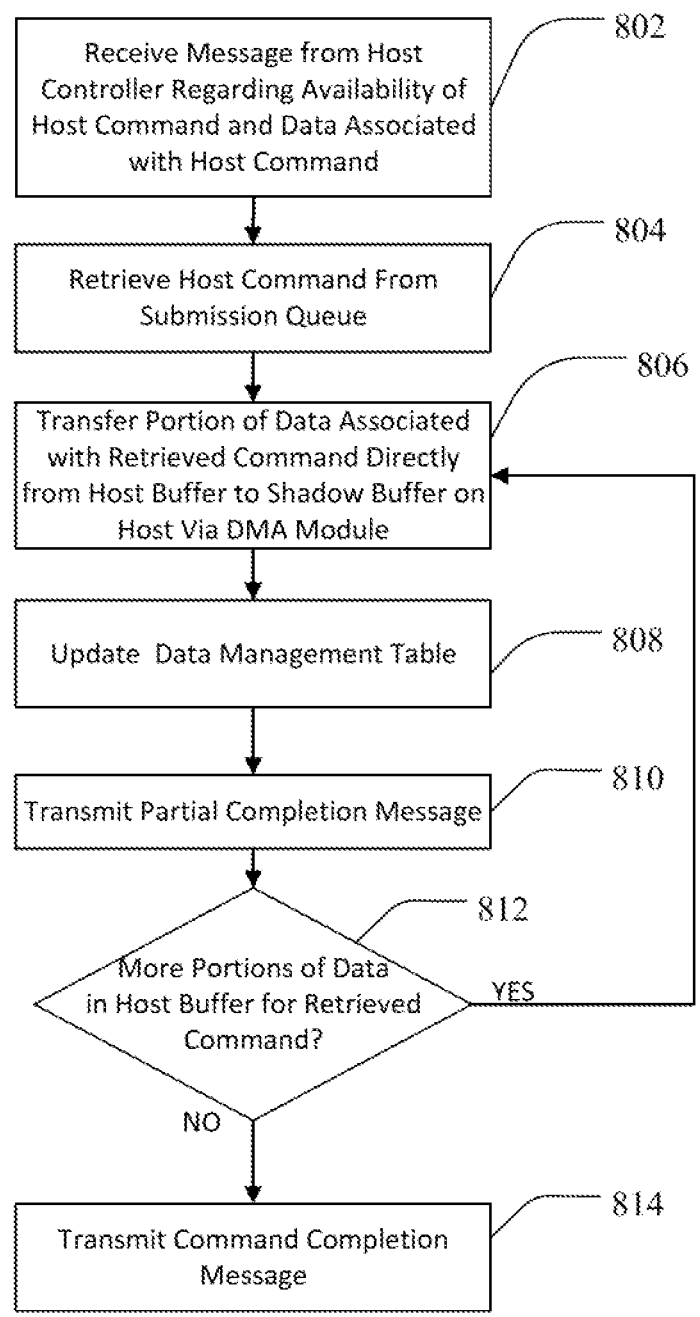
FIG. 8 is a flow chart illustrating an alternative embodiment of the method of FIG. 6.

Referring now to FIG. 8, an alternative method of utilizing partial write completion techniques is illustrated for hosts having a direct memory access module 300, such as described for the example host 312 in FIG. 3. In this implementation, after receiving a message from the host 312 that a host command is available for execution in the submission queue 220, the partial write completion module 112 may retrieve the host command from the submission queue 220 and identify the location of the associated data for that command in the host data buffer 218 (at 802, 804). The partial write completion module 112 may then send instructions to the DMA module 300 on the host 312 to locate and move a data chunk of the set of data chunks associated with the host write command directly from the host data buffer 218 to the shadow buffer 217 (at 806) on the host 312. The partial write completion module 112 would not first copy the chunk of data from the host data buffer 218 to the data buffer 117 in RAM 116, and then separately copy that chunk from the data buffer 117 on the NVM system 100 to the shadow buffer 217 on the host 312 as was the case in the implementation of FIG. 6. Instead, the data chunk may be copied via the DMA module 300 directly from host data buffer 218 to shadow buffer 217 on the host 312 without the data chunk needing to leave the host or pass through the controller 102 on the NVM system 100. A data management table 113 in the partial write completion module 112 may be updated to reflect the current status of the chunk of data as written to the shadow buffer 217 (at 808). The data management table 113 may include the logical block address (LBA) range (e.g. LBAx to LBAy, where x and y refer to start and end LBA addresses for a contiguous string of LBA addresses) and the associated address range in the shadow buffer 217 where that LBA range is currently stored.

After each data chunk is copied, and only after the success of the write of the data chunk to the shadow buffer 217 is verified using a verification procedure such as the ECC check described above, the partial write completion module 112 may generate and transmit a partial completion message to the host 312 that includes sending to the partial completion queue 224 identification information for the data chunk and its address in the host data buffer 218 (at 810). As noted with respect to FIG. 7, the host controller 214 can use this information to release and use that portion of the host data buffer 218 before all data chunks associated with the particular host command have been written to the shadow buffer 217. If more data chunks are still to be written, then the process repeats where the controller 102 instructs the DMA module 300 to directly write the next chunk of data associated with the command from the host data buffer 218 to the shadow buffer 217, and a partial completion message sent, until all chunks have been written (at 812). A command completion message may be sent from the controller 102 in the NVM system 100 to the host 312 after all chunks have been written (814). The command completion message may include command identification and/or data identification information placed in the completion queue 222 of the host by the NVM system 100, as well as an interrupt sent to notify host controller 214 to check the completion queue 222.

In one implementation, the NVM system 100 may be configured to operate with hosts 212, 312, 412 capable of maintaining and utilizing a partial completion queue 224 to accept and act on partial completion messages regarding chunks (subsets) of a total set of data associated with a host command, as well as with legacy hosts, where the host only understands standard write completion messages that are sent from an NVM system 100 upon completion of a write of all data associated with the command. In order to maintain the backwards compatibility with legacy hosts lacking the partial completion queue and shadow buffer, a handshake message may be sent from the host 212 to the NVM system 100 at power-up identifying partial write completion capabilities and shadow buffer information. For example, in one embodiment, the host controller 214 may be configured to send at power-up or at first connection of the NVM system 100 to the host 212, a configuration message that includes the addresses of all buffers or queues in the host (e.g., host data buffer address, shadow buffer address, and submission, completion and partial completion queue addresses). The controller 102 of the NVM system 100 is configured to recognize the configuration message. Additionally, the host 212 may send the NVM system 100 addresses and formats for interrupts the host 212 needs to receive in order to use the partial completion functionality.

The NVM system 100 may recognize the handshake message and/or configuration message to identify partial write completion capability, or the absence of such messages to identify legacy only capability. In a legacy mode of operation, the controller 102 may default to aggregating host data in the data buffer 117 until a predetermined amount of data has accumulated. Once this predetermined amount has accumulated, it may be written to non-volatile memory on the non-volatile memory die. Then, after writing all of the data associated with a given command, the NVM system 100 may send a completion command to the host 212 which can release all data for the command from the host data buffer. In contrast, when the handshake and/or configuration message sent by the host 212 at power up indicates partial write completion capabilities, the controller may adjust its internal data buffer 117 operation to write chunks of data to a shadow buffer or non-volatile memory as soon as a particular data chunk is retrieved from the host data buffer 218, rather than waiting for any predetermined amount of data to accumulate in the data buffer 117.

In another variation of the method and system discussed above, a system and method including use of a shadow buffer, but not a partial completion message functionality, is contemplated. In this variation, retrieval of chunks of data from the host data buffer, storage of the retrieved data locally in a data buffer 117 on the NVM system 100 and then copying that data to a shadow buffer 217, 417 on the host 212 or external device 402 is contemplated without use of any partial completion messages as each chunk of the total amount of data associated with a command is written to the shadow buffer. Instead, the movement of data from host data buffer 218 to local data buffer 117 on the NVM system 100, and then copying of that data from the data buffer 117 to a shadow buffer 217, 417 outside the NVM system 100 is contemplated, where only a single host command completion message is sent from the NVM system 100 to the host after all the data associated with a command has been stored in the shadow buffer. Also, as no partial completion messages are sent, no partial completion queue on the host is needed or utilized in this alternative implementation.

Figure 9:
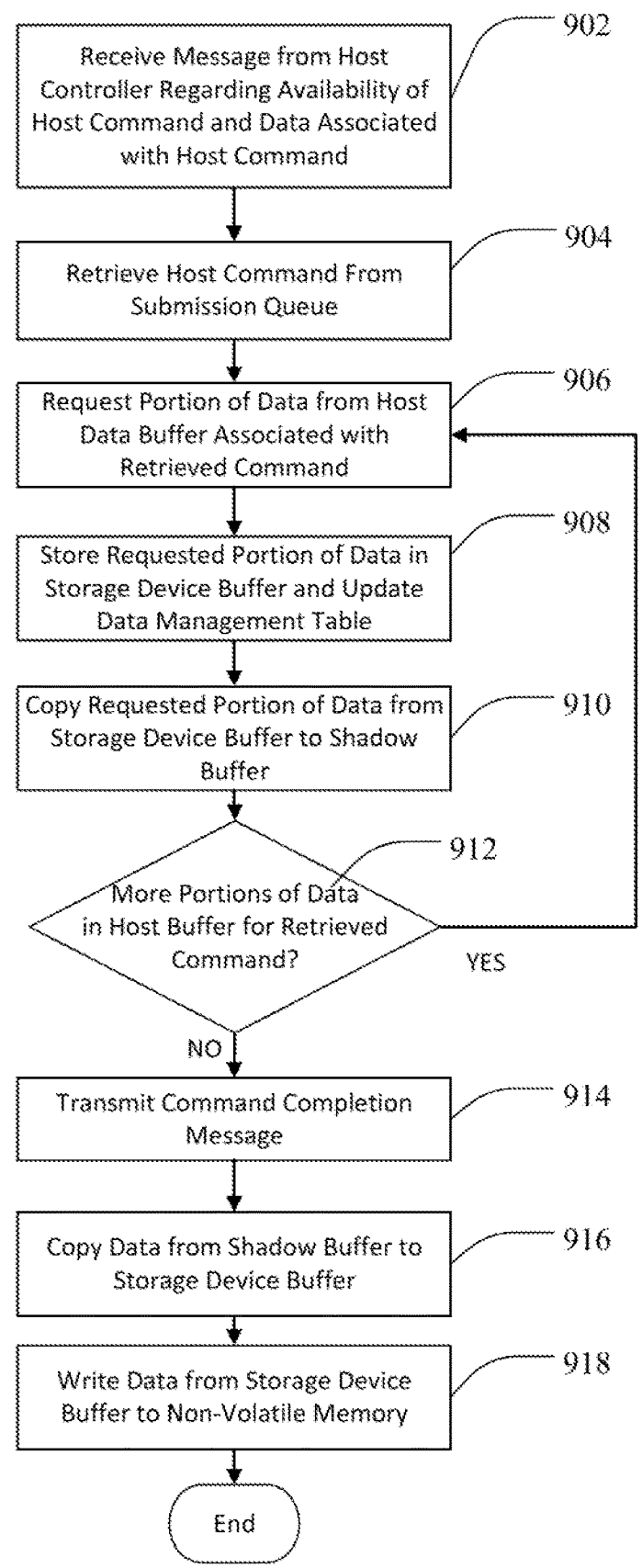
FIG. 9 is a flow chart illustrating a method executable on the systems of FIG. 2A or 4, where data is first written from the host buffer to a local buffer on the non-volatile memory system, and then written from the local buffer to a shadow buffer, on the host or on an external memory device managed by the non-volatile memory system.

Referring to FIG. 9, in this alternative variation a message is received from the host 212 alerting the controller 102 that a host command is waiting (at 902). The controller 102 may then retrieve the command from the host submission queue 220, followed by retrieving a portion (for example a chunk) of data associated with the retrieved command from the host data buffer (at 904, 906). The controller 102 may then store the portion of data in the local data buffer 117 in the NVM system 100, as well as update the data buffer management table 113 to identify where in the local data buffer 117 the LBA range of the stored data currently resides (at 908). The controller 102 then transfers the data from the data buffer 117 to a shadow buffer 217 on the host 212 or a shadow buffer 417 on an external memory 402 and further updates the data buffer management table 113 (at 910). No partial completion message is sent for any data chunk written to the shadow buffer in this implementation.

Once all the portions of data associated with the particular host command have been copied to the shadow buffer, a command completion message may be sent from the controller 102 to the host 212 (at 912, 914). The host controller 214 may then release the portion of the host data buffer 218 holding all the data associated with the host command. The retrieval of data from the host data buffer 218 to the local buffer on the NVM system 100 and then copying that data from the local buffer to a shadow buffer 217, 417 controlled by the NVM system 100 but located on the host or an external memory device may provide the NVM system 100 additional flexibility by leveraging memory space on the host or external memory device. Although the shadow buffer 217, 417 on the host 212 or external memory device 402 may be a volatile memory such as RAM, other types of memories are contemplated. Also, although the NVM system may send a command completion message to the host after all of the data for the host command is in the shadow buffer 217, 417, a subsequent write of the data from the shadow buffer 217, 417 to the local data buffer 117, and then from the local data buffer 117 to a non-volatile memory array 142 in the NVM memory system 100 is contemplated as a final destination for the data associated with the host command (at 916, 918). The embodiment of FIG. 9, although omitting partial completion messages, utilizes shadow buffers 217, 417 so that the NVM system 100 may leverage the generally less expensive RAM space available on a host or an external storage device.

Figure 10:
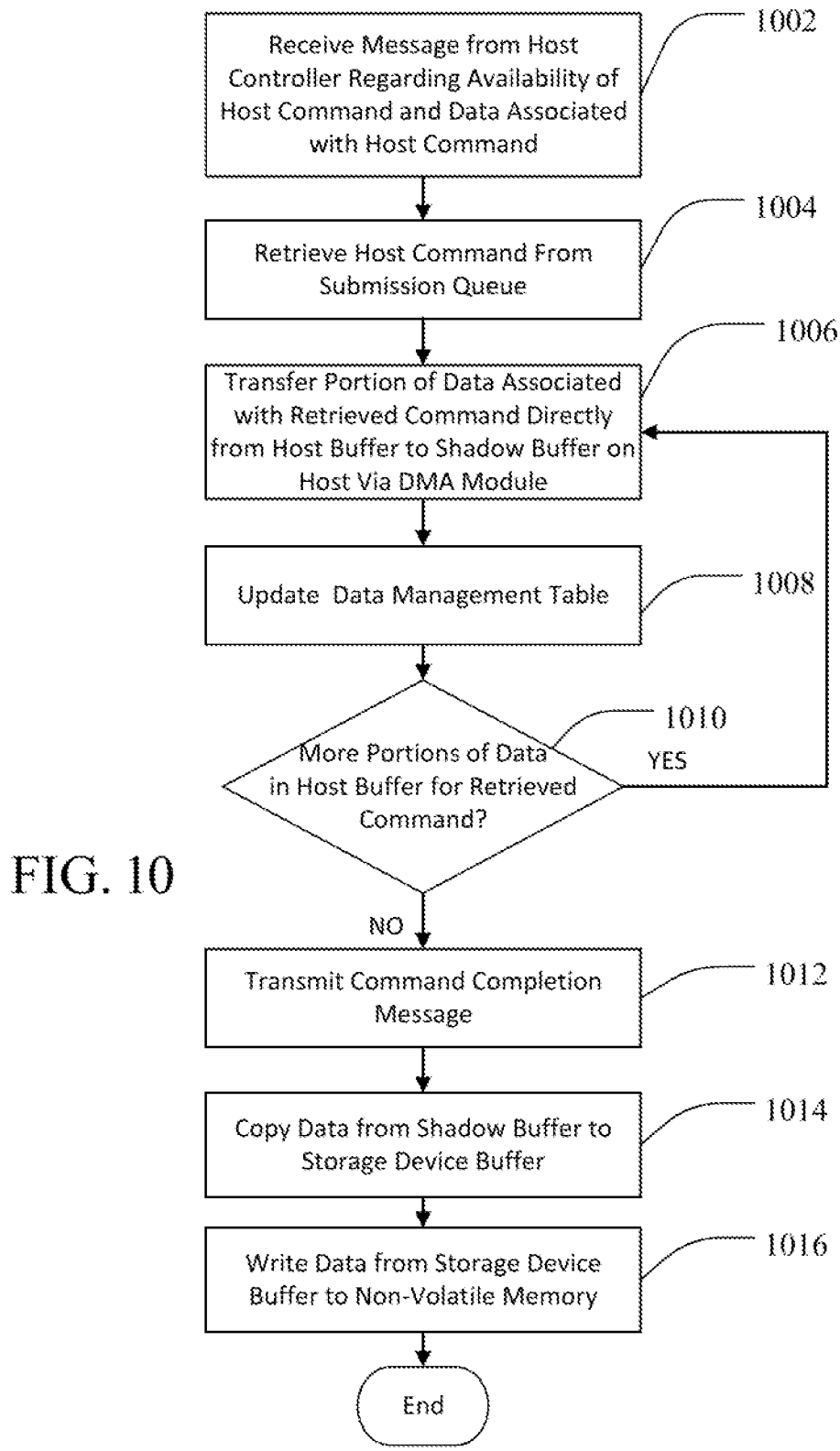
FIG. 10 is flow chart illustrating use of a shadow buffer on a host without use of partial command completion messages.

Another process for utilizing a shadow buffer 217 but without utilizing partial write completion messages is illustrated in FIG. 10. In the process of FIG. 10, a NVM system 100 includes a controller 102 that may be configured to utilize a shadow buffer 217 on a host 312 having a DMA module 300 such as shown in FIG. 3. In this embodiment, many of the same steps as indicated in FIG. 8 may be carried out by the controller 102 of the NVM system with the exception of the transmission of any partial completion messages of step 810 (and thus without the resultant incremental freeing of the host data buffer by the host responsive to partial write completion messages). The process of FIG. 10 may include receiving a message from the host 312 that a host command is available for execution in the submission queue 220 (at 1002). The partial completion module 112 of the controller 102 may retrieve the host command from the submission queue 220 and identify the location of the associated data for that command in the host data buffer 218 (at 1004). The partial write completion module 112 may then send instructions to the DMA module 300 on the host 312 to locate and move a data chunk of the set of data chunks associated with the host write command directly from the host data buffer 218 to the shadow buffer 217 (at 1006) on the host 312. The partial write completion module 112 would not first copy the chunk of data from the host data buffer 218 to the data buffer 117 in RAM 116, and then separately copy that chunk from the data buffer 117 on the NVM system 100 to the shadow buffer 217 on the host 312 as was the case in the implementation of FIG. 6. Instead, the data chunk may be copied via the DMA module 300 directly from the host data buffer 218 to the shadow buffer 217 on the host 312 without the data chunk needing to leave the host or pass through the controller 102 on the NVM system 100. A data management table 113 in the partial write completion module 112 may be updated to reflect the current status of the chunk of data as written to the shadow buffer 217 (at 1008). The data management table 113 may include the logical block address (LBA) range (e.g. LBAx to LBAy, where x and y refer to start and end LBA addresses for a contiguous string of LBA addresses) and the associated address range in the shadow buffer 217 where that LBA range is currently stored.

Unlike the process of FIG. 8, in the process of FIG. 10 no partial write completion message is generated or sent after each individual data chunk is transferred to the shadow buffer. If more data chunks are still to be written, then the process repeats where the controller 102 instructs the DMA module 300 to directly write the next chunk of data associated with the command from the host data buffer 218 to the shadow buffer 217, and no completion message is sent, until all chunks have been written (at 1010). Only after all data chunks for a given host command have been processed, and the success of the direct transfer of all the data chunks from the host data buffer 218 to the shadow buffer 217 for the particular host command verified, will the controller 102 of the NVM system 100 send the host 312 a command completion message (at 1012). Thus, the embodiments of both FIG. 9 and FIG. 10 may send data associated with a host command directed to writing the data to the non-volatile memory array 142 to a shadow buffer, instead of the non-volatile memory array, send a completion message to the host once all the data associated with the host command has been written to the shadow buffer, and later write the data into the non-volatile memory array from the shadow buffer via the local data buffer in the NVM system.

The verification of data transfer may be a verification procedure such as the ECC check described above or simply a verification received at the controller 102 from the DMA module 300 that the transfer is complete. The command completion message may include command identification and/or data identification information placed in the completion queue 222 of the host by the NVM system 100, as well as an interrupt sent from the controller 102 to notify host controller 214 to check the completion queue 222. The host 312 may then release and overwrite the portion of the host data buffer 218 containing all the data chunks for that host command. Subsequently, the controller 102 may copy the data from the shadow buffer 217 to the local data buffer 117, and then write the data from the local data buffer 117 to the non-volatile memory die 104 (at 1014, 1016). The controller 102 may retrieve any of the data chunks again from the shadow buffer 217 on the host 312 if an error occurs, such as may be caused by an unexpected power failure on the NVM system 100, during the process of writing the data from the shadow buffer on the host to the non-volatile memory array 142 in the non-volatile memory die 104 via the local data buffer 117.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A system and method for accelerated utilization of a data buffer in a host by command completion in parts has been described. Rather than waiting until all data for a particular host command, such as a host write command, is written and then sending a write completion message, partial write completion messages are sent to the host from the NVM system as soon as each chunk (subset) of the total amount of data associated with the host command is written to the NVM system. The trigger for sending the partial completion message may be the writing of the chunk of data into non-volatile memory cells in the NVM system, or writing the chunk to a shadow buffer on the host, or on a separate memory device, that is controlled by the NVM system. The host may then use the partial completion messages to release the relevant parts of the host data buffer, accelerating the data transfer rate between the host and the device and allowing the host to continue processing and more utilize its data buffer.

Additionally, a system and method for utilizing a shadow buffer to permit early release of data from a host data buffer prior to writing that data to a final destination of non-volatile memory cells is described. Only after all data for a particular host command has been written to the shadow buffer, but before that data has been written to non-volatile memory as required by the particular host command, is a completion message sent from the NVM system to the host to allow the host to free up the space in the host data buffer holding the data associated with the host command. The data in the shadow buffer may then be written to the volatile memory in the NVM system.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A data storage system comprising:
   a non-volatile memory;
   a volatile memory having a local data buffer;
   a controller in communication with the non-volatile memory and the volatile memory, the controller configured to:
   (i) request, from a host data buffer on a host in communication with the data storage system, one of a plurality of data subsets of data associated with a particular host write command, the particular host write command comprising instructions to write the plurality of data subsets to the non-volatile memory;
   (ii) cause the host to write the requested one of the plurality of data subsets directly from the host data buffer to a shadow buffer on the host without transferring the requested one of the plurality of data subsets to the data storage system;
   repeat steps (i) and (ii) until the plurality of data subsets of the particular host write command have been written to the shadow buffer, wherein the shadow buffer is controlled by the data storage system;
   after the plurality of data subsets of the particular host write command have been written to the shadow buffer, and prior to storing any of the plurality of data subsets in data storage system, transmit a command completion message to the host to permit the host to release a portion of the host data buffer used to store the plurality of data subsets associated with the particular host write command; and
   after transmitting the command completion message, copy each of the plurality of data subsets from the shadow buffer to the local data buffer in the data storage system, and write each of the plurality of data subsets from the local data buffer to the non-volatile memory.

2. The data storage system of claim 1, wherein the shadow buffer is separate from the host data buffer.

3. The data storage system of claim 2, wherein the shadow buffer comprises volatile memory.

4. The data storage system of claim 1, wherein each of the plurality of data subsets associated with the particular host write command comprises data having contiguous host logical block addresses.

5. The data storage system of claim 1, wherein the non-volatile memory comprises a silicon substrate and a plurality of memory cells forming a monolithic three-dimensional structure, wherein at least one portion of the memory cells is vertically disposed with respect to the silicon substrate.

6. A non-transitory computer readable medium comprising processor executable instructions that, when executed by a controller of a data storage system, cause the controller to:
   request, from a host data buffer on a host in communication with the data storage system, data associated with a particular host command, the particular host command comprising a command to write the data to non-volatile memory in the data storage system;
   instruct the host to write the data associated with the particular host command directly from the host data buffer to a shadow buffer on the host without transferring the requested one of the plurality of data subsets to the data storage system;
   transmit a command completion message to the host to permit the host to release portions of the host data buffer used to store the data associated with the particular host command after the data of the particular host command has been written to the shadow buffer, and prior to storing any of the data in the data storage system;
   subsequent to transmission of the command completion message, copy the data for the particular host command from the shadow buffer memory to a local data buffer in the data storage system, wherein the shadow buffer is controlled by the data storage system; and
   write the data for the particular host command from the local data buffer to the non-volatile memory.

7. The non-transitory computer readable medium of claim 6, wherein the shadow buffer comprises a buffer in volatile memory located in the host and the shadow buffer being separate from the host data buffer.

8. A method of managing data in a storage system in communication with a host, the method comprising the storage system:
   requesting data associated with a pending host command from a host data buffer in the host, the pending host command comprising an instruction to write the requested data to a non-volatile memory in the storage system;
   writing the requested data to a shadow buffer in volatile memory on the host, the shadow buffer being separate from the host data buffer, wherein writing the requested data to the shadow buffer comprises a controller of the storage system causing the host to write the requested data directly from the host data buffer to the shadow buffer without first transferring the requested data to the storage system;
   in response to verifying that the requested data associated with the pending host command has been written to the shadow buffer on the host, and prior to writing any of the requested data associated with the pending host command to the storage system, transmitting a command completion message to the host indicating that the host may release space in the host data buffer corresponding to all of the data associated with the pending host command;
   subsequent to transmission of the command completion message, copying the requested data from the shadow buffer on the host to a local data buffer in volatile memory in the storage system, wherein the shadow buffer is controlled by the data storage system;
   and writing the requested data from the local data buffer to the non-volatile memory.

9. The method of claim 8, wherein causing the host to write the requested data directly from the host data buffer to the shadow buffer comprises the controller causing the host to individually write each of a plurality of portions of the requested data directly to the shadow buffer.

* * * * *